(12) United States Patent
Braddy

(10) Patent No.: US 9,841,924 B2
(45) Date of Patent: *Dec. 12, 2017

(54) SYNCHRONIZATION STORAGE SOLUTION

(71) Applicant: SoftNAS Operating Inc., Houston, TX (US)

(72) Inventor: Rick Gene Braddy, Houston, TX (US)

(73) Assignee: SoftNAS Operating Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,858

(22) Filed: May 27, 2016

(65) Prior Publication Data

US 2016/0274796 A1 Sep. 22, 2016

Related U.S. Application Data

(63) Continuation of application No. 14/562,413, filed on Dec. 5, 2014, now Pat. No. 9,378,262.

(Continued)

(51) Int. Cl.
*G06F 21/00* (2013.01)
*G06F 3/06* (2006.01)
(Continued)

(52) U.S. Cl.
CPC .............. *G06F 3/065* (2013.01); *G06F 3/067* (2013.01); *G06F 3/0619* (2013.01);
(Continued)

(58) Field of Classification Search
CPC ...... G06F 3/065; G06F 3/0619; G06F 3/0653; G06F 3/067; G06F 17/30581;
(Continued)

(56) References Cited

U.S. PATENT DOCUMENTS 6,636,873 B1 * 10/2003 Carini ............... G06F 17/30578
7,146,499 B2 * 12/2006 Yellepeddy ......... G06F 11/2069
380/264

(Continued)

OTHER PUBLICATIONS

Malkhi, Dahlia, and Michael K. Reiter. "Secure and scalable replication in Phalanx." Reliable Distributed Systems, 1998. Proceedings. Seventeenth IEEE Symposium on. IEEE, 1998.*

(Continued)

*Primary Examiner* — Chau Le
*Assistant Examiner* — Muhammad Chaudhry
(74) *Attorney, Agent, or Firm* — Polsinelli PC

(57) ABSTRACT

A system of replicating data stored on a source node. Replication can be configured between two controllers, the source node on the one hand, and a target node on the other. A synchronization relationship between the source node and the target node is established and maintained. The synchronization relationship can be quickly and easily created for disaster recovery, real-time backup and failover, thereby ensuring that data on the source node is fully-protected at an off-site location or on another server or VM, for example, at another data center, a different building or elsewhere in the cloud. Processes described herein streamline the entire replication setup process, thereby significantly reducing error rates in conventional systems and making the replication process more user friendly than in conventional systems.

20 Claims, 14 Drawing Sheets

Related U.S. Application Data

(60) Provisional application No. 61/913,211, filed on Dec. 6, 2013.

(51) Int. Cl.

| | | |
|---|---|---|
| *G06F 17/30* | (2006.01) | |
| *H04L 29/08* | (2006.01) | |
| *G06F 11/20* | (2006.01) | |
| *H04L 9/14* | (2006.01) | |
| *H04L 9/30* | (2006.01) | |
| *H04L 9/32* | (2006.01) | |
| *H04L 29/06* | (2006.01) | |

(52) U.S. Cl.
CPC ........ *G06F 3/0653* (2013.01); *G06F 11/2033* (2013.01); *G06F 17/30581* (2013.01); *H04L 9/14* (2013.01); *H04L 9/30* (2013.01); *H04L 9/32* (2013.01); *H04L 63/061* (2013.01); *H04L 63/08* (2013.01); *H04L 67/1095* (2013.01); *H04L 67/1097* (2013.01); *H04L 67/025* (2013.01); *H04L 67/10* (2013.01)

(58) Field of Classification Search
CPC ............... G06F 11/2033; H04L 63/061; H04L 67/1097; H04L 63/08; H04L 9/14; H04L 9/30; H04L 9/32; H04L 67/1095; H04L 67/025; H04L 67/10
See application file for complete search history.

(56) References Cited

U.S. PATENT DOCUMENTS

| | | | | |
|---|---|---|---|---|
| 7,865,741 B1* | 1/2011 | Wood | ................... | G06F 21/606 380/277 |
| 8,135,930 B1* | 3/2012 | Mattox | ............... | G06F 9/45558 711/100 |
| 8,819,362 B1* | 8/2014 | Duprey | ................... | G06F 12/16 711/161 |
| 8,930,667 B2* | 1/2015 | Alatorre | ............ | G06F 17/30165 711/112 |
| 9,088,538 B2* | 7/2015 | Lindteigen | .......... | H04L 63/0442 |
| 9,286,369 B2* | 3/2016 | Pei | ................... | G06F 17/30581 |
| 2003/0037029 A1* | 2/2003 | Holenstein | ........ | G06F 17/30578 |
| 2004/0148479 A1 | 7/2004 | Patel et al. | | |
| 2006/0291637 A1* | 12/2006 | Erickson | ............ | H04M 3/2218 379/202.01 |
| 2010/0232288 A1* | 9/2010 | Coatney | .............. | G06F 11/2033 370/221 |
| 2014/0317409 A1* | 10/2014 | Bartok | .................... | H04L 63/06 713/171 |

OTHER PUBLICATIONS

Cachin, Christian, and Jonathan A. Poritz. "Secure intrusion-tolerant replication on the Internet." Dependable Systems and Networks, 2002. DSN 2002. Proceedings. International Conference on. IEEE, 2002.*

Zheng, Lantian, et al. "Using replication and partitioning to build secure distributed systems." Security and Privacy, 2003. Proceedings. 2003 Symposium on. IEEE, 2003.*

Subbiah, Arun, and Douglas M. Blough. "An approach for fault tolerant and secure data storage in collaborative work environments." Proceedings of the 2005 ACM workshop on Storage security and survivability. ACM, 2005.*

Wang, Cong, et al. "Toward secure and dependable storage services in cloud computing." IEEE transactions on Services Computing 5.2 (2012): 220-232.*

\* cited by examiner

SYNCHRONIZATION STORAGE SOLUTION

CROSS-REFERENCE TO RELATED APPLICATION

This application is a continuation of U.S. patent application Ser. No. 14/562,413, filed Dec. 5, 2014, which claims priority to U.S. Provisional Application No. 61/913,211, filed Dec. 6, 2013, the contents of which are entirely incorporated by reference herein.

FIELD

The subject matter herein generally relates to providing synchronization storage solutions.

BRIEF DESCRIPTION OF THE DRAWINGS

Implementations of the present technology will now be described, by way of example only, with reference to the attached figures, wherein.

DETAILED DESCRIPTION

Figure 1:
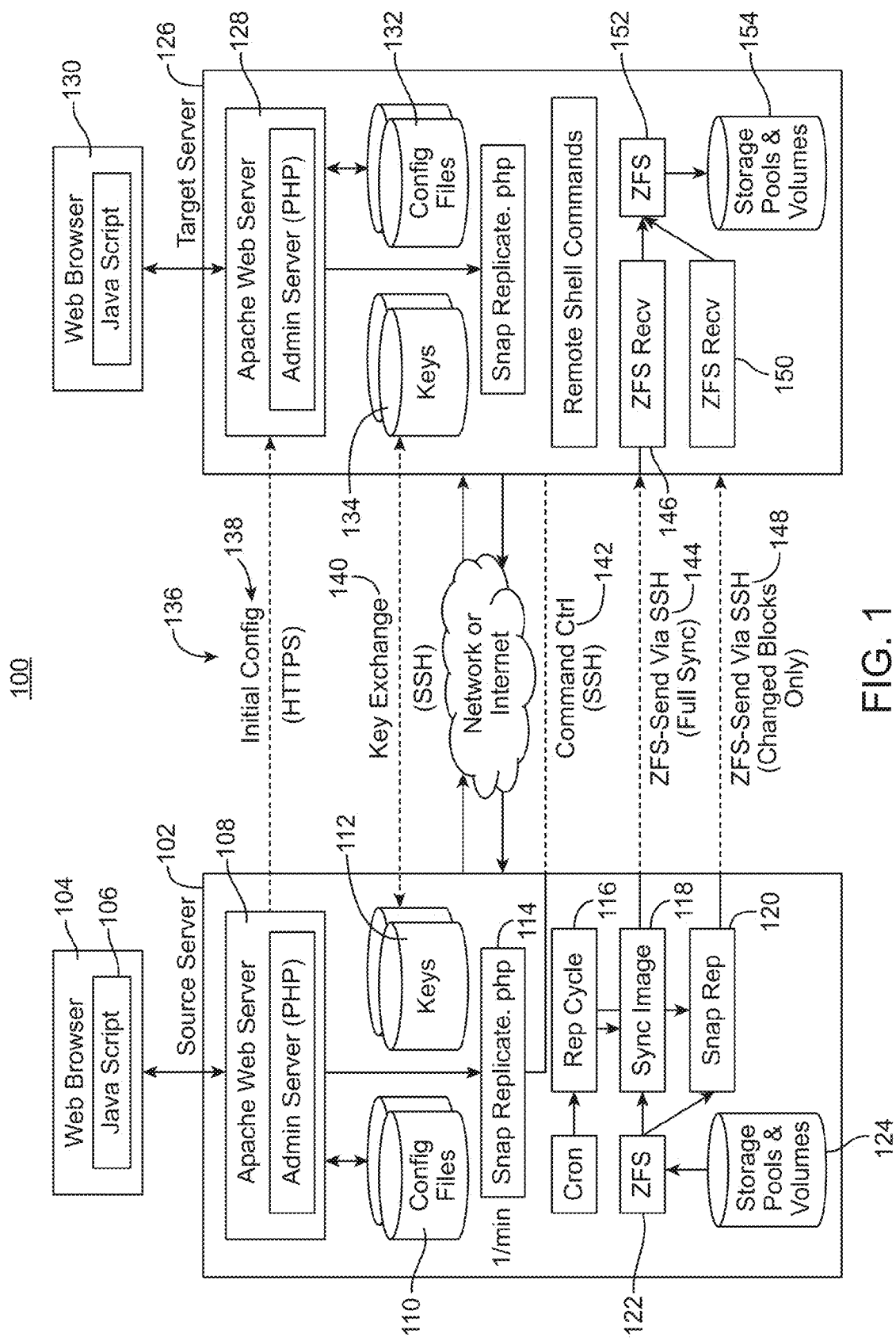
FIG. 1 is an example of a possible system architecture implementing the current disclosed subject matter.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term coupled is defined as directly or indirectly connected to one or more components. The term server can include a hardware server, a virtual machine, and a software server. ZFS is a combined file system and logical volume manager designed by Sun Microsystems. The features of ZFS include protection against data corruption, support for high storage capacities, efficient data compression, integration of the concepts of file system and volume management, snapshots and copy-on-write clones, continuous integrity checking and automatic repair, RAID-Z and native NFSv4 ACLs. A pool is defined as one or more data storage devices such as disks aggregated to create a unit of storage. Secure Shell (SSH) is a cryptographic network protocol for secure data communication, remote command-line login, remote command execution, and other secure network services between two networked computers that connects, via a secure channel over an insecure network, a server and a client (running SSH server and SSH client programs, respectively). The protocol specification distinguishes between two major versions that are referred to as SSH-1 and SSH-2, both of which are comprised by SSH within this disclosure. Certain aspects of this disclosure pertain to public-key cryptography. Public-key cryptography, also known as asymmetric cryptography, is a class of cryptographic algorithms which requires two separate keys, one of which is secret (or private) and one of which is public. Although different, the two parts of this key pair are mathematically linked. The public key is used to encrypt plaintext or to verify a digital signature; whereas the private key is used to decrypt ciphertext or to create a digital signature. The term "asymmetric" stems from the use of different keys to perform these opposite functions, each the inverse of the other—as contrasted with conventional ("symmetric") cryptography which relies on the same key to perform both. Public-key algorithms are based on mathematical problems which currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally infeasible) for a properly generated private key to be determined from its corresponding public key. Thus the public key may be published without compromising security, whereas the private key must not be revealed to anyone not authorized to read messages or perform digital signatures. Public key algorithms, unlike symmetric key algorithms, do not require a secure initial exchange of one (or more) secret keys between the parties.

In at least one embodiment, the present technology can be implemented as a software module or a hardware module, or both. In at least one embodiment, the present technology causes a processor to execute instructions. The software module can be stored within a memory device or a drive. The present technology can be implemented with a variety of different drive configurations including Network File System (NFS), internet Small Computer System Interface (iSCSi), and Common Internet File System (CIFS). Additionally, the present technology can be configured to run on VMware ESXi (which is an operating system-independent hypervisor based on the VMkernel operating system interfacing with agents that run on top of it. Additionally, the present technology can be configured to run on Amazon® Web Service in VPC.

The present technology is configured to provide fast and user-friendly ways to add powerful storage replication, backup and disaster recovery to data management systems. In at least one embodiment, the system of the present technology provides real-time block replication for failover and business continuity, and for site-to-site data transfers such as region-to-region data replicas across Amazon EC2 data centers or VMware failover across data centers.

In at least one embodiment, data is replicated from a source node to a target node. The present technology is configured for efficient scaling, which can enable it handle replication of millions of files quickly and efficiently.

Unlike conventional clustered file systems, at least one embodiment of the present technology uses block replication, which only sends the changed data blocks from source to target. This block replication avoids the need to do wasteful, resource-intensive file comparisons, since anytime a file's contents are updated, the copy-on-write file system keeps track of which data blocks have changed and only sends the changed blocks between two snapshot markers per a period of time, which can be one minute, or less.

The present technology is configured to enable fast and easy methods to quickly configure a complete replication and disaster recovery solution in very short periods of time, often no more than one. The automated methods within the technology avoid the need for complex scripting and detailed user-input and/or instructions.

In at least one embodiment of the present technology, replication can be configured between two controllers, a source node on the one hand, and a target node on the other. In at least one embodiment of the technology, a synchronization relationship between the source node and the target node is established. The synchronization relationship can be quickly and easily created for disaster recovery, real-time backup and failover, thereby ensuring that data on the source node is fully-protected at an off-site location or on another server or VM, for example, at another data center, a different building or elsewhere in the cloud. Processes described herein streamline the entire replication setup process, thereby significantly reducing error rates in conventional systems and making the replication process more user friendly than in conventional systems.

At least one embodiment of the present technology is a method of establishing a synchronization relationship between data storage nodes in a system. The method can include providing access to at least one source node via a user-interface, where the source node is configurable to store at least one source storage pool and at least one source volume. The method can also include receiving an internet protocol address of at least one target node, where the target node is configurable to store at least one target storage pool and at least one target volume. The method can also include: receiving log-in credentials corresponding to the at least one target node; providing access to the at least one target node, based on the received log-in credentials; and establishing a replication relationship between the nodes. Establishing a replication relationship can include: creating at least one public key; creating at least on private key; authorizing two-way communication between the nodes via at least one secure shell; exchanging the at least one public key between the nodes; and confirming two-way communication between the nodes via at least one secure shell. The method can also include automatically discovering the information present on both nodes necessary to achieve replication; including determining at least which storage pools and volumes need to be replicated. Such determination can involve automatically discovering the storage pools on the nodes that have a same name; automatically discovering the volumes in each such storage pool; automatically configuring tasks necessary for each volume to be replicated; automatically determining whether a full back-up or synchronization from the source node to the target node of all storage pools and volumes in the source node is necessary; and executing the full back-up or synchronization from the source node to the target node of all storage pools and volumes in the source node, upon such determination. The method can also further include, performing a data replication once per minute. The data replication can involve synchronizing data on the source node to the target node which has changed within the last two minute.

FIG. 1 is an example of a possible system 100 architecture implementing the current disclosed subject matter. A source server 102 is shown. The source server 102 can be in signal communication with a device running a web browser 104, which can be run using programs such as javasript 106. The web browser 104 can be used to implement command and instructions to, and receive information from, the source server 102. The source server 102 can include or be coupled to an Apache Web Server 108. As shown, the Apache Web Server can be coupled to a storage unit 110 storing one or more configuration files. Also within the source server 102 is at least one storage unit 112 storing keys, which can be public keys or private keys or both. As shown, the Apache Web Server 108 can control a snap replicate device or process 114. The snap replicate process 114 can be executed once every minute, as shown. Snap replication 114 can include a replication cycle, which can include a sync image process and a snap replicate process 120, as will be discussed below. The sync image process 118 and the snap replicate process 120 can be controlled by a file system and logical volume manager such as ZFS 122. ZFS 122 can manage the sync image process 118 and the snap replicate process 120 with regard to data in storage pools and volumes corresponding to the source node or source server 102.

Also shown in FIG. 1 is a target server or target node 126. The target server 126 can contain or be in communication with an Apache Web Server 128 and be in signal communication with a web browser. The target server 126 can contain or be coupled to a data storage unit 132 containing configuration files. The target server 126 can also contain or be coupled to a data storage unit 134 containing public keys or private keys or both. The Apache Web Server 128 can control snap replicate processes on the target server. The source server 102 and the target server 126 can be configured for two-way communication between them. Thus the Apache Web Server 108 corresponding to the source server 102 can send initial configuration instructions to the Apache Web Server 128 of the target server 128. Two-way communication 136 also enables the exchange of keys between the servers (102, 126). Two-way communication 136 also enables control commands 142 to be transmitted from the source server 102 to the target server 126. Two-way communication 136 further enables ZFS 122 to send full sync commands and data 144 to a ZFS receiver 146 on the target server 126, and enables ZFS 122 to send snap replicate commands and data 148 to a second ZFS receiver of the target server 126. A ZFS unit 152 of the target server 126 updates the storage pools and volumes 154 of the target server with the received ZFS data (144, 148), thereby synchronizing them with the storage pools and volumes 124 of the source server 102.

Figure 2:
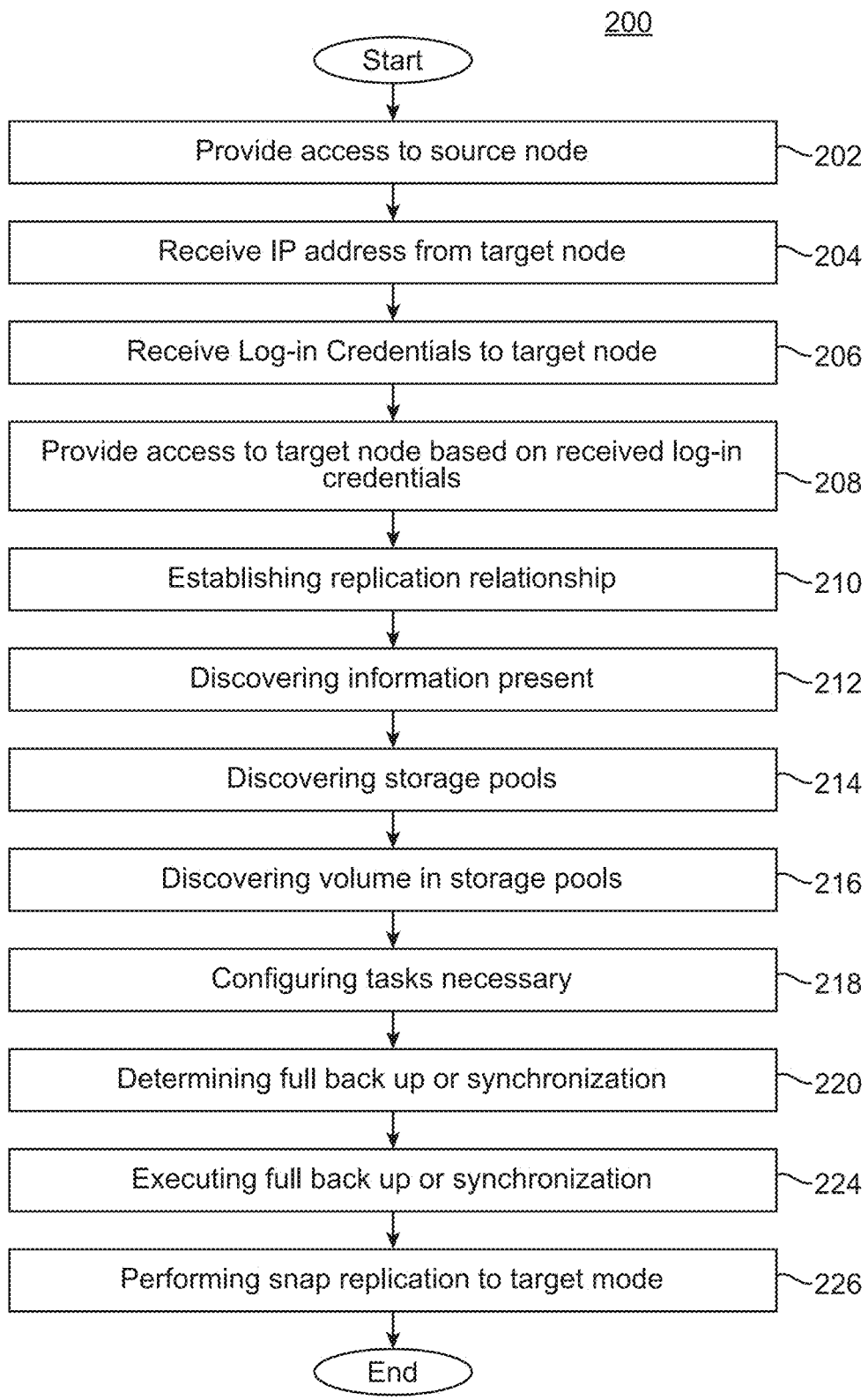
FIG. 2 is an example of a method according to the present disclosure.

The present disclosure also includes a method 200 as illustrated with respect to FIG. 2. As illustrated, the method includes several steps. The steps illustrated are for illustration purposes and other steps can be implemented. Additionally, while a particular order is illustrated in FIG. 2, the present technology can be implemented in other arrangements such that the order of the steps can be different than that as illustrated. Furthermore, the present technology can include steps that are not illustrated and other embodiments can be such that one or more of the steps are removed. The method is described in relation to two servers, which can be any device as described above. For example, the servers as described below can be network attached storage devices.

The method 200 comprises providing (202) access to at least one source node via a user-interface. The source node can be configurable to store at least one source storage pool and at least one source volume. After step 202 is completed, the method proceeds to step 204. Step 204 comprises receiving an internet protocol (IP) address of at least one target node. The target node can be configurable to store at least one target storage pool and at least one target volume. Once step 204 is completed, the method proceeds to step 206, which is the receiving of log-in credentials corresponding to the at least one target node. After correct log-in credentials are received, the method proceeds to step 208, which consists of providing access to the at least one target node, based on the received log-in credentials. After step 208 is completed, the method 200 proceeds to step 210, which comprises establishing a replication relationship between the nodes. Step 210 can include creating at least one public key, creating at least on private key, authorizing two-way communication between the nodes via at least one secure shell (SSH), exchanging the at least one public key between the nodes, and confirming two-way communication between the nodes via at least one secure shell. Once step 210 is completed, the method 200 can proceed to step 212 which can include automatically discovering the information present on both nodes necessary to achieve replication, (including but not limited to) determining at least which storage pools and volumes need to be replicated. Determining begins at step 214, which can include automatically discovering the storage pools on the nodes that have a same name. Once step 214 is finished, the method 200 can proceed to step 216, which can include automatically discovering the volumes in each such storage pool. After step 216 is completed, the method 200 can proceed to step 218, which consists of automatically configuring or establishing the tasks which are necessary for each volume to be replicated. Once step 218 is complete, the method 200 can proceed to step 220, which consists of automatically determining whether a full back-up (or synchronization) from the source node to the target node of all storage pools and volumes in the source node is necessary. Once the determination of step 220 is completed, the method 200 proceeds to step 224, which consists of executing the full back-up (or synchronization) from the source node to the target node of all storage pools and volumes in the source node, if necessary. At this point the nodes can be considered synchronized. The method 200 then proceeds to step 226, which consists of performing a data replication once per a first predetermined period (for example one minute), the data replication comprising synchronizing data on the source node to the target node which has changed within a second predetermined period (for example 2 minutes).

Figure 3:
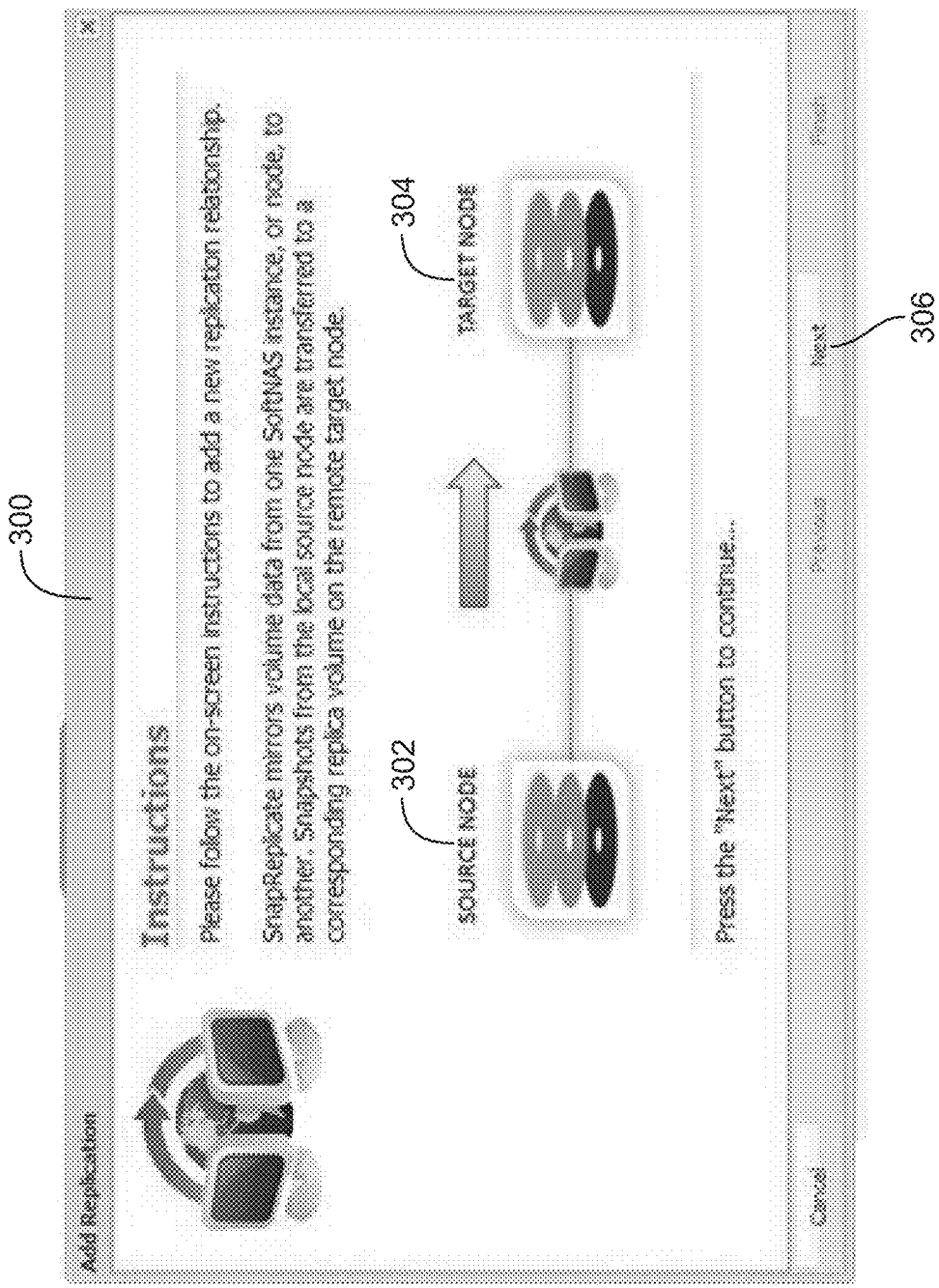
FIG. 3 through FIG. 10 illustrate example screen shots of a user-interface depicting aspects of this disclosure.
Figure 4:
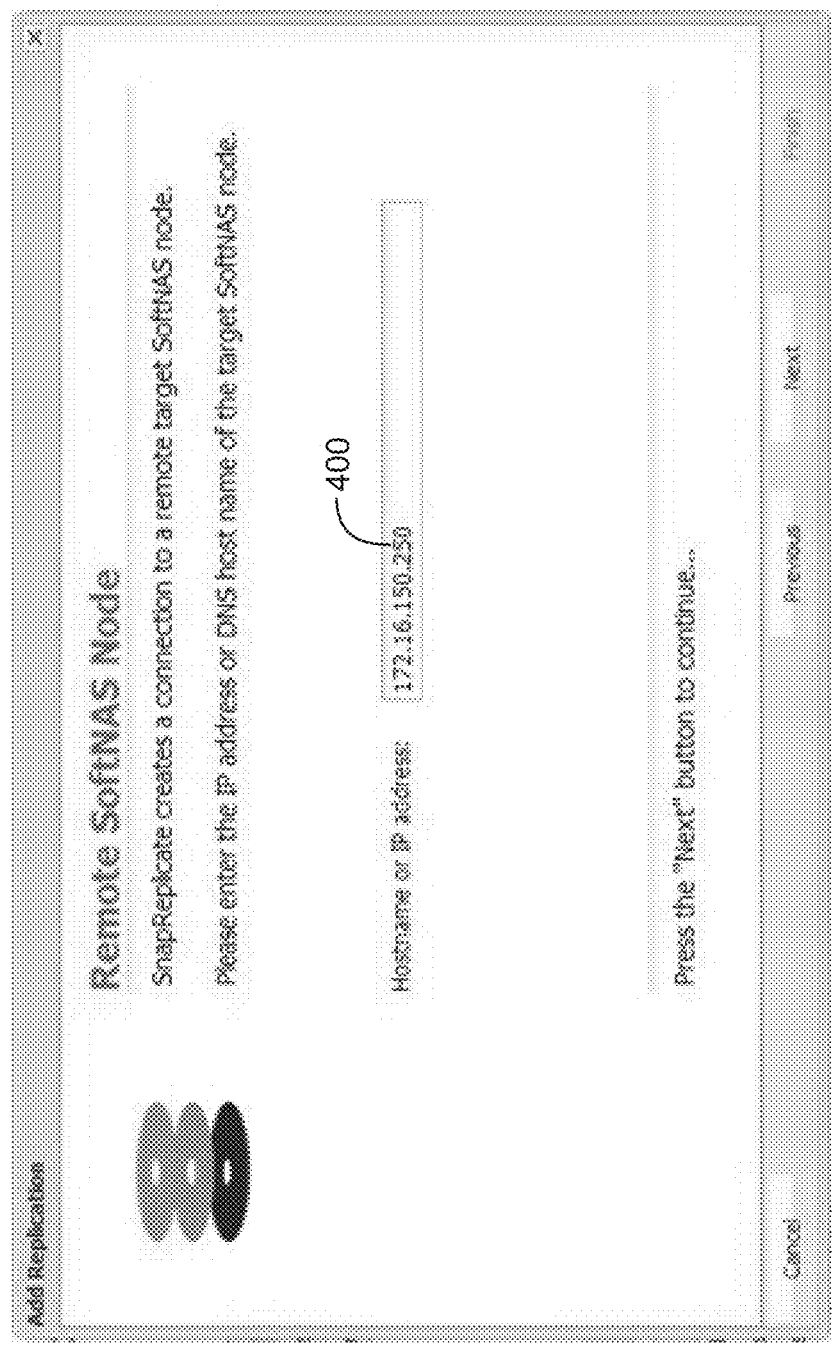
Figure 5:
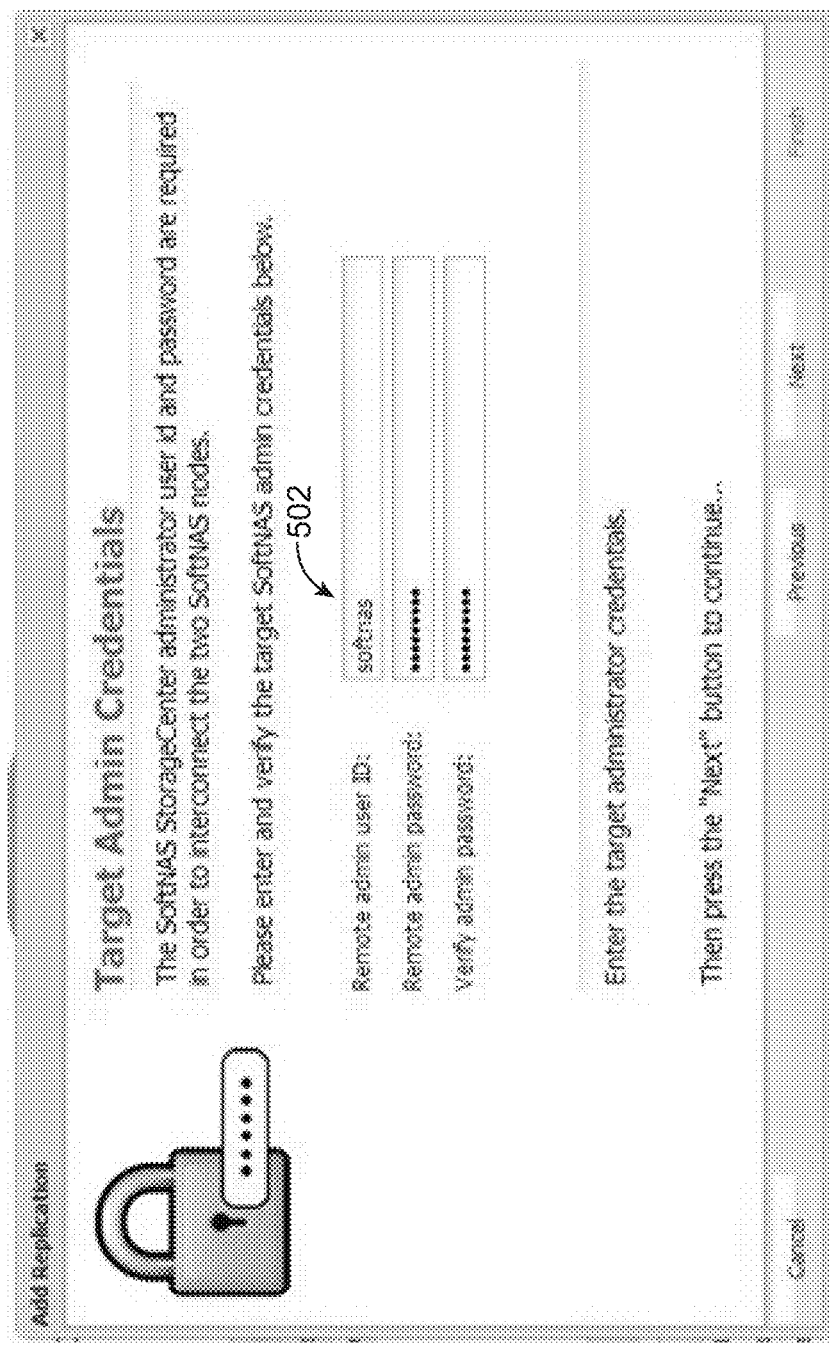
Figure 6:
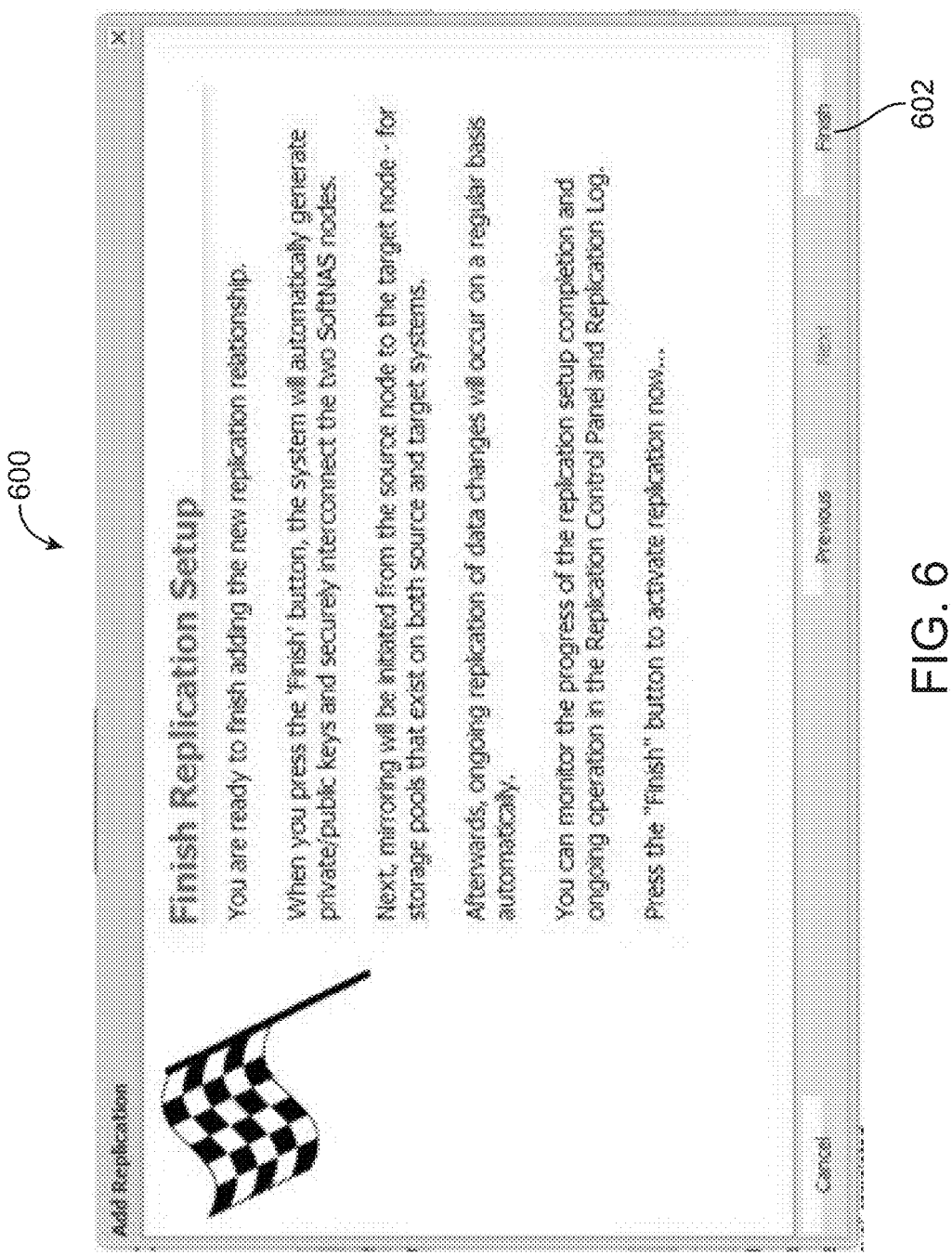
Figure 7:
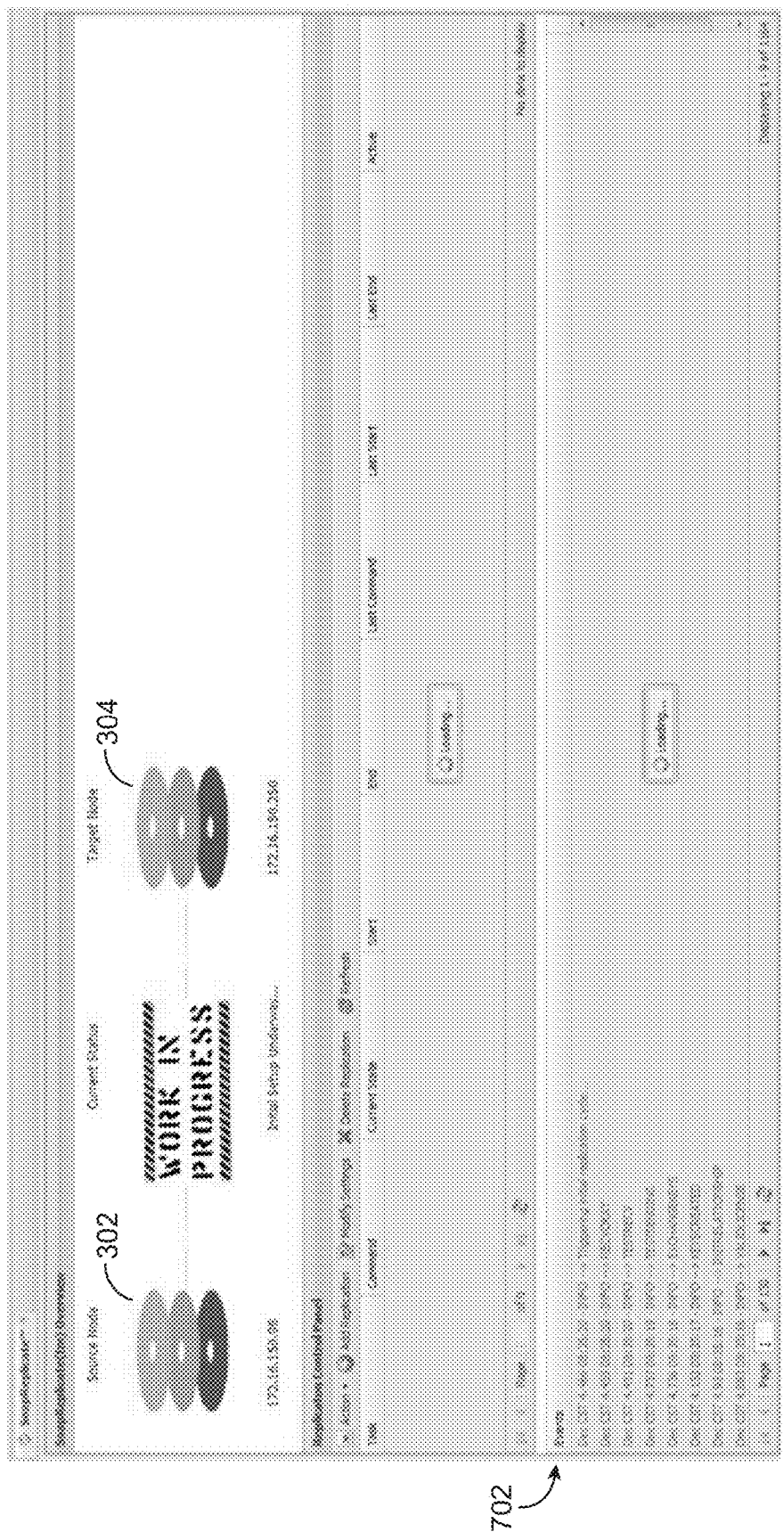
Figure 8:
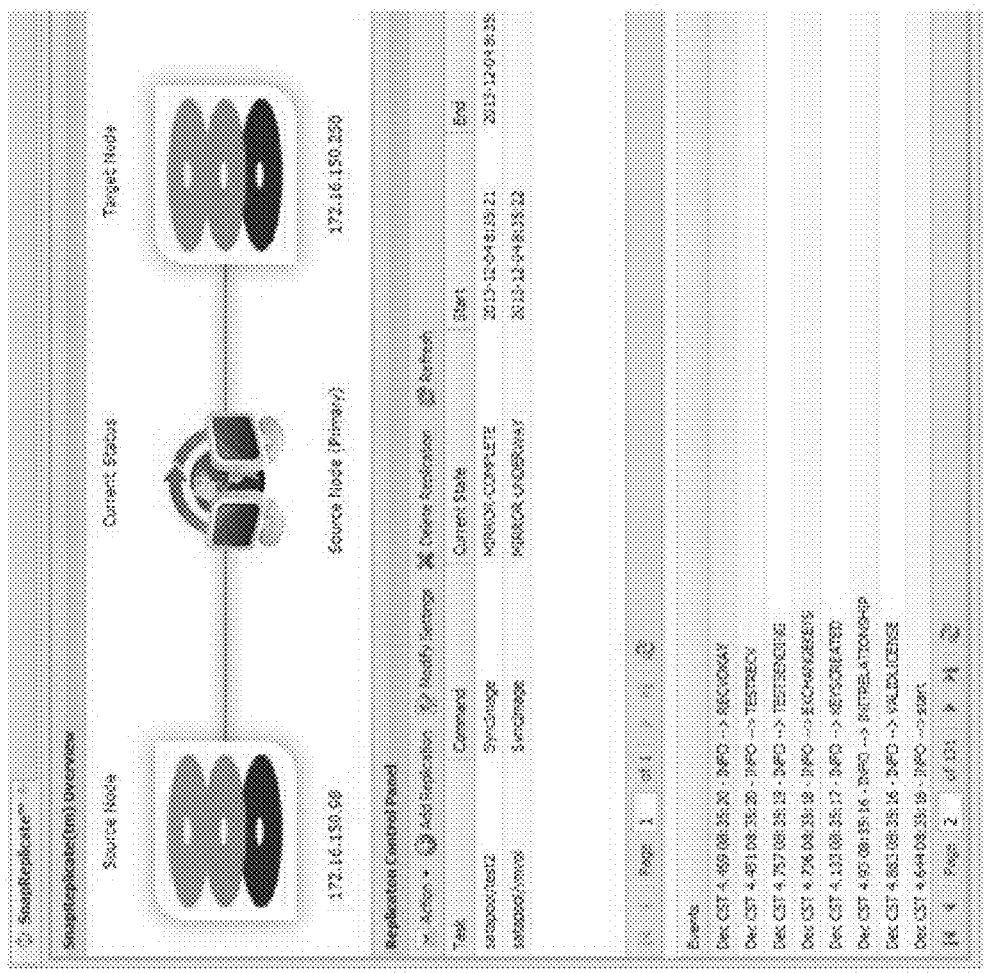
Figure 9:
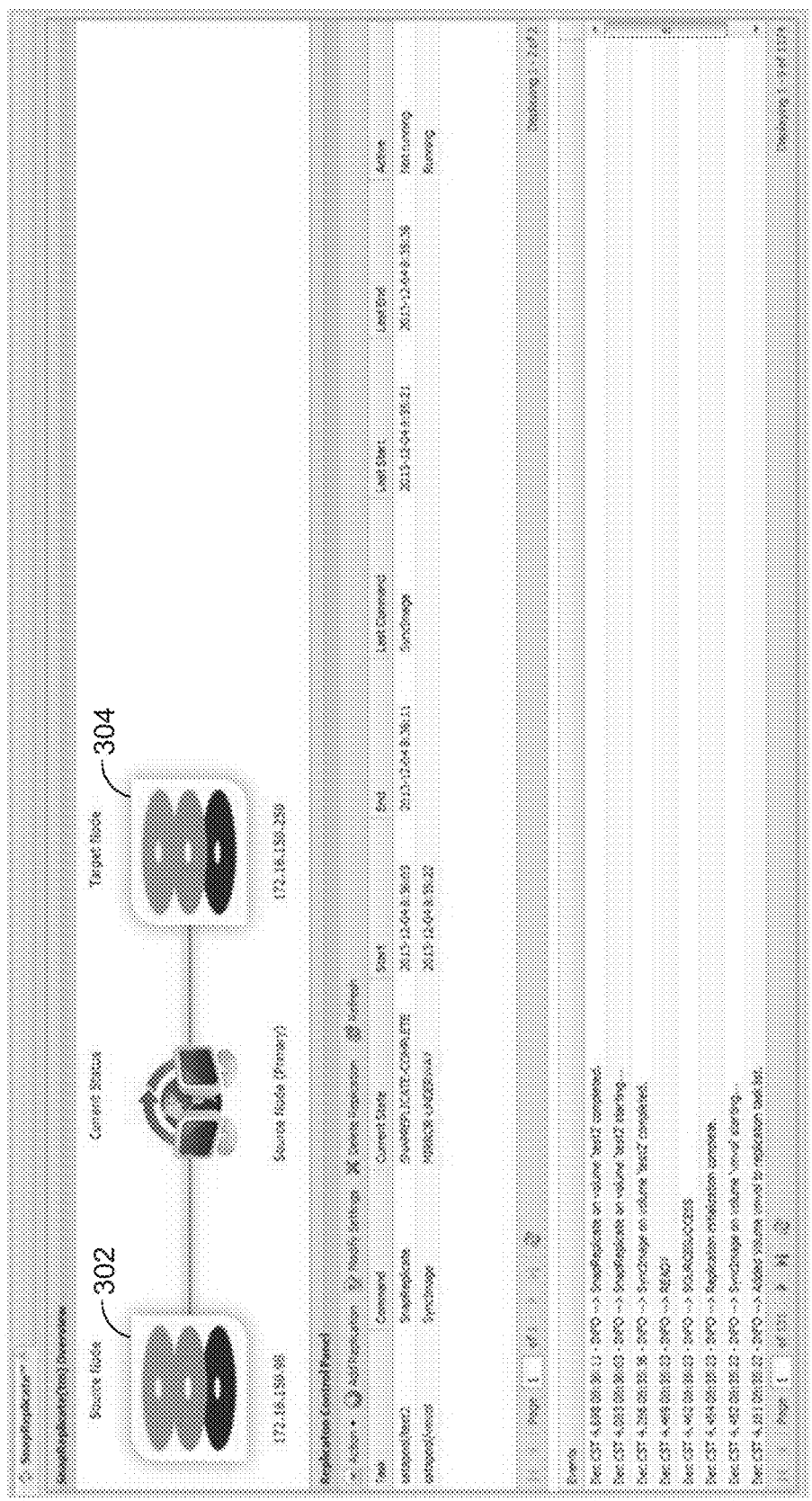
Figure 10:
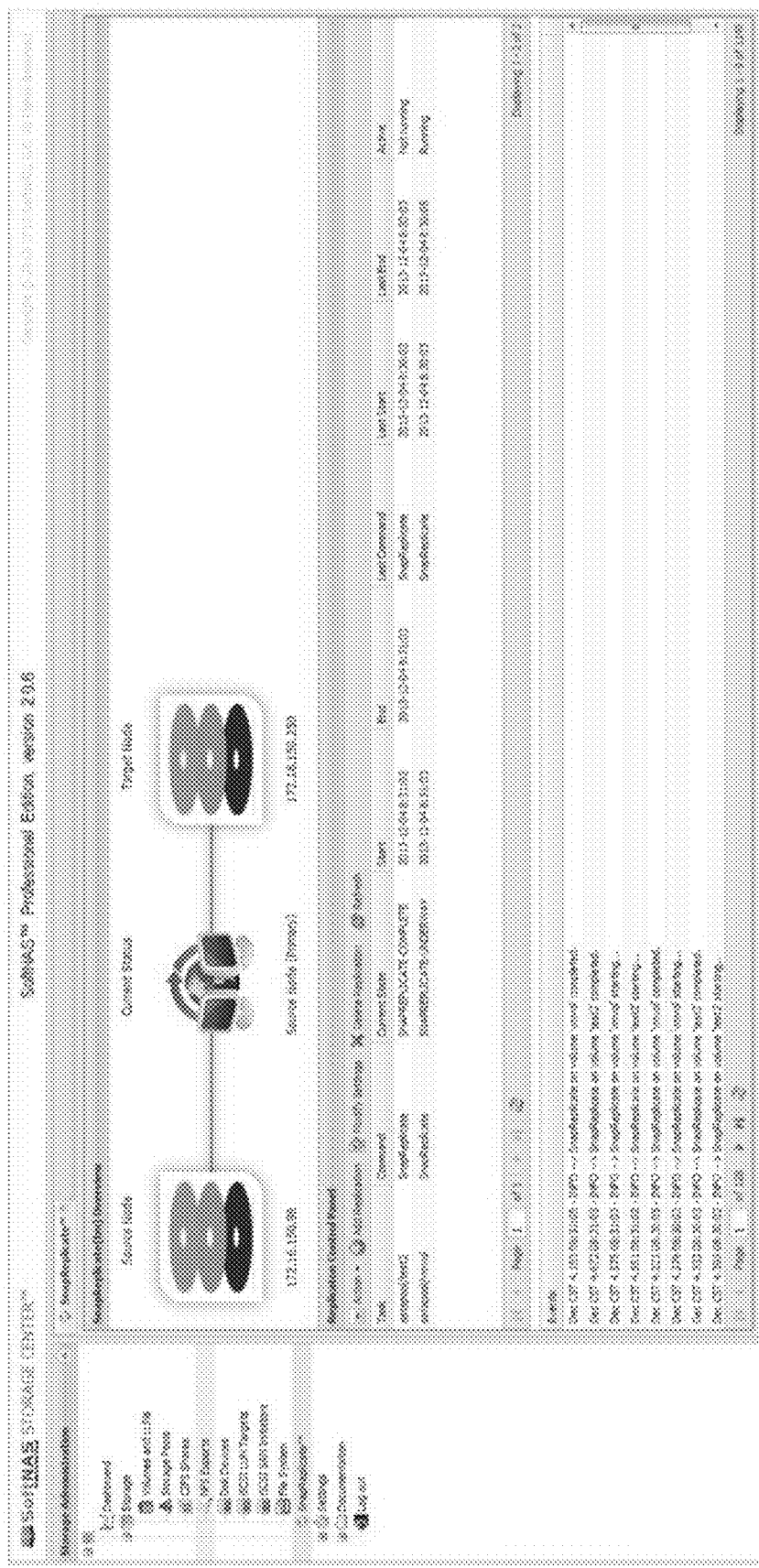

FIG. 3 through FIG. 10 illustrate example screen shots of a user-interface depicting aspects of this disclosure. FIG. 3 illustrates a user-interface 300 inviting a user to establish a replication relationship between a source node 302 and a target node 304. The user is invited to press the "next" button 306 to continue. FIG. 4 illustrates a user-interface rendered after button 306 has been pressed (or selected). As shown, the user can enter an IP address 400 for a desired target node 304. Once the IP address is entered and accepted, the user is invited to enter log-in credentials 502 for the target node 304, as shown in FIG. 5. Once the log-in credentials 502 are verified and accepted, the user-interface renders the image shown in FIG. 6. As shown in FIG. 6, once the user selects "finish" 602 replication of the source node 302 to the target node 304 can begin. No further action is required for replication. The simplicity, ease and speed with which replication can be established within this disclosure is advantageous. FIG. 7 illustrates a user-interface depicting initialization of a replication relationship between the source node 302 and the 304 target node. Various events 702 which occur during initialization are noted, as will be described in greater detail below. FIG. 7 illustrated a user-interface depicting the completion of the initialization of FIG. 6, as will be described below. FIG. 8 illustrates a user-interface depicting a snap replicate process, in which only those data elements which have changed in the last cycle on the source node 302 are replicated on the target node 304. FIG. 9 illustrates a user-interface depicting a complete snap replicate process (see FIG. 8). Aspects of FIG. 3 through FIG. 10 will be explained in greater detail in the discussions of FIG. 11 through FIG. 14 below.

Figure 11:
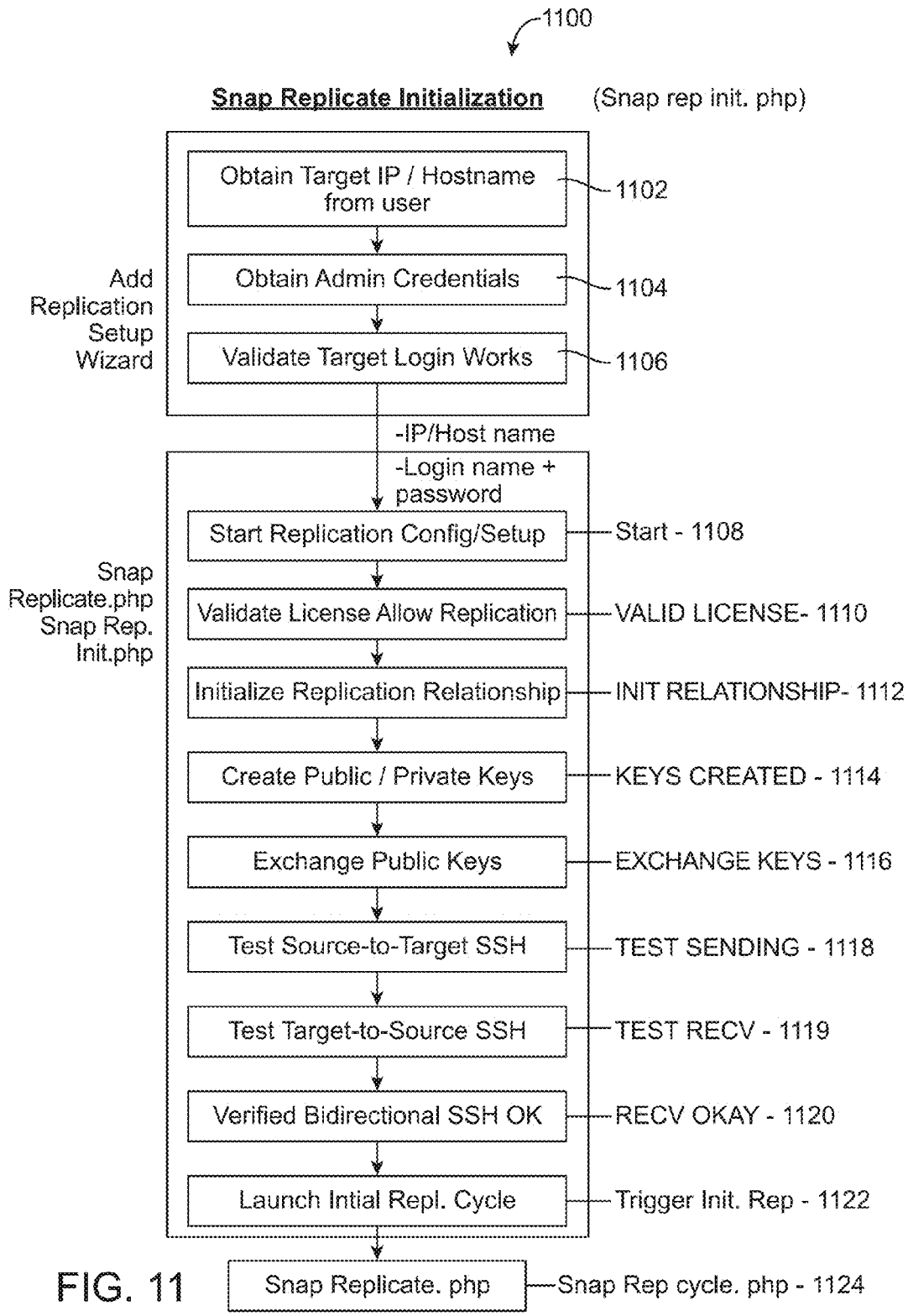
FIG. 11 illustrates a method of data replication initialization 1100 within this disclosure.

FIG. 11 illustrates a method of data replication initialization 1100 within this disclosure. The method begins at step 1102, in which a target IP-address or hostname is received from user. Once this information is received, the method 1100 proceeds to step 1104, which consists of obtaining administrative credentials for a target node 304. The method 1100 then proceeds to step 1106 in which log-in information for the desired target node 304 is validated. The method 1100 then proceeds to step 1108, in which the start of a replication is configured and setup. Once step 1108 is completed, the method 110 proceeds to step 1112, in which a user-purchased license is validated to allow replication. Once step 1112 is completed, the method 1100 proceeds to step 1112, in which the replication relationship between the nodes is initialized. Once the initialization is complete, the method 1100 proceeds to step 1114 in which appropriate public and private keys are created. The method 1100 then proceeds to step 1116, in which the created keys are exchanged. The method 1100 then proceeds to step 1118 in which a test communication is sent from the source node 302 to the target node 304. The method 1100 then proceeds to step 1119 in which a test communication is sent from the target node 304 to the source node 302. Bidirectional communication between the nodes via SSH is then verified (1120). The method 1100 then proceeds to step 1122, in which an initial replication cycle is launched. Thereafter, the method proceeds to step 1124, in which data replication cycles are performed, in which only recently changed data blocks are replicated (on the target node 304), as described above.

Figure 12:
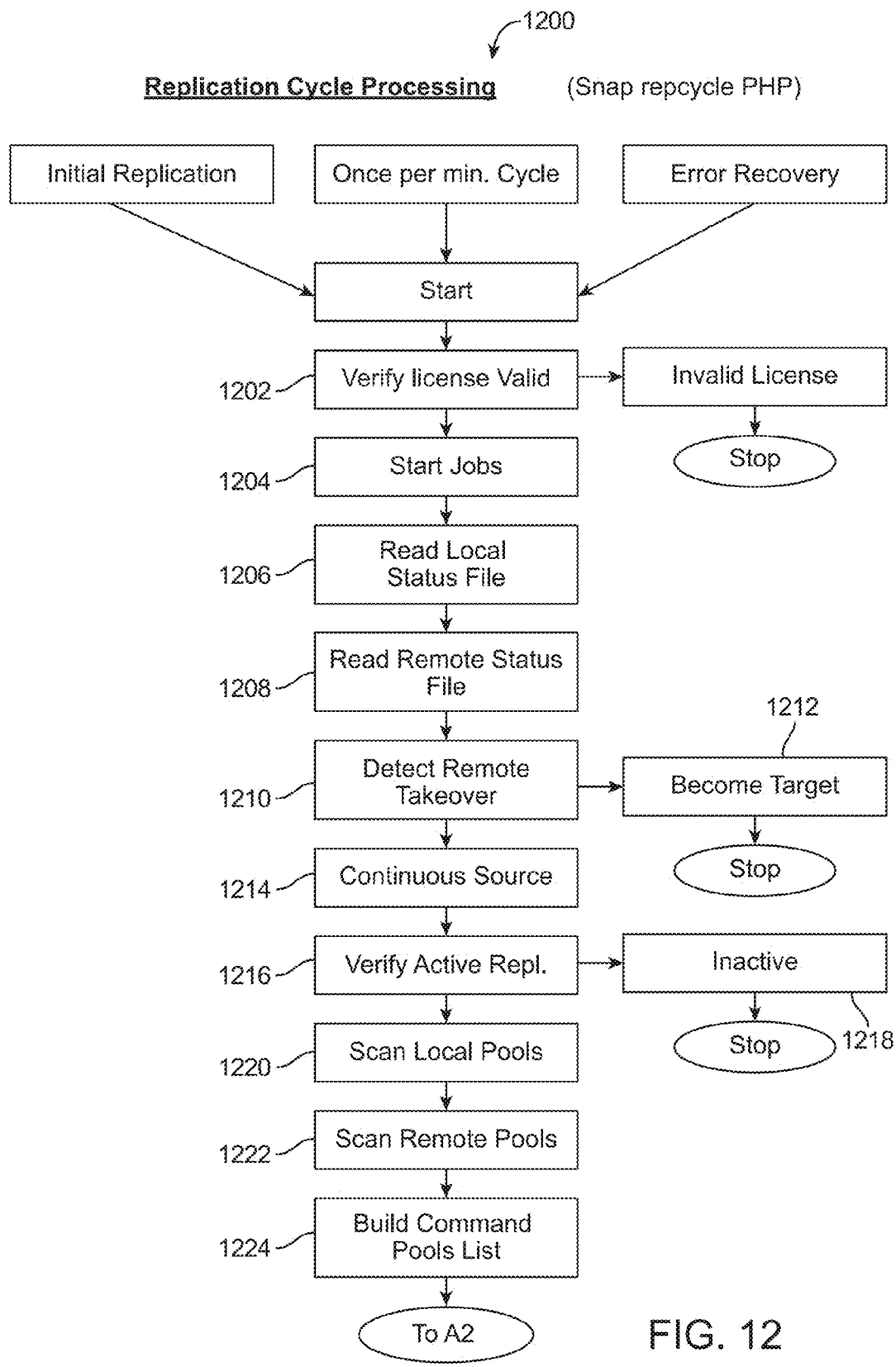
FIG. 12 and FIG. 13 illustrate a method 1200 of replication cycle processing within this disclosure.
Figure 13:
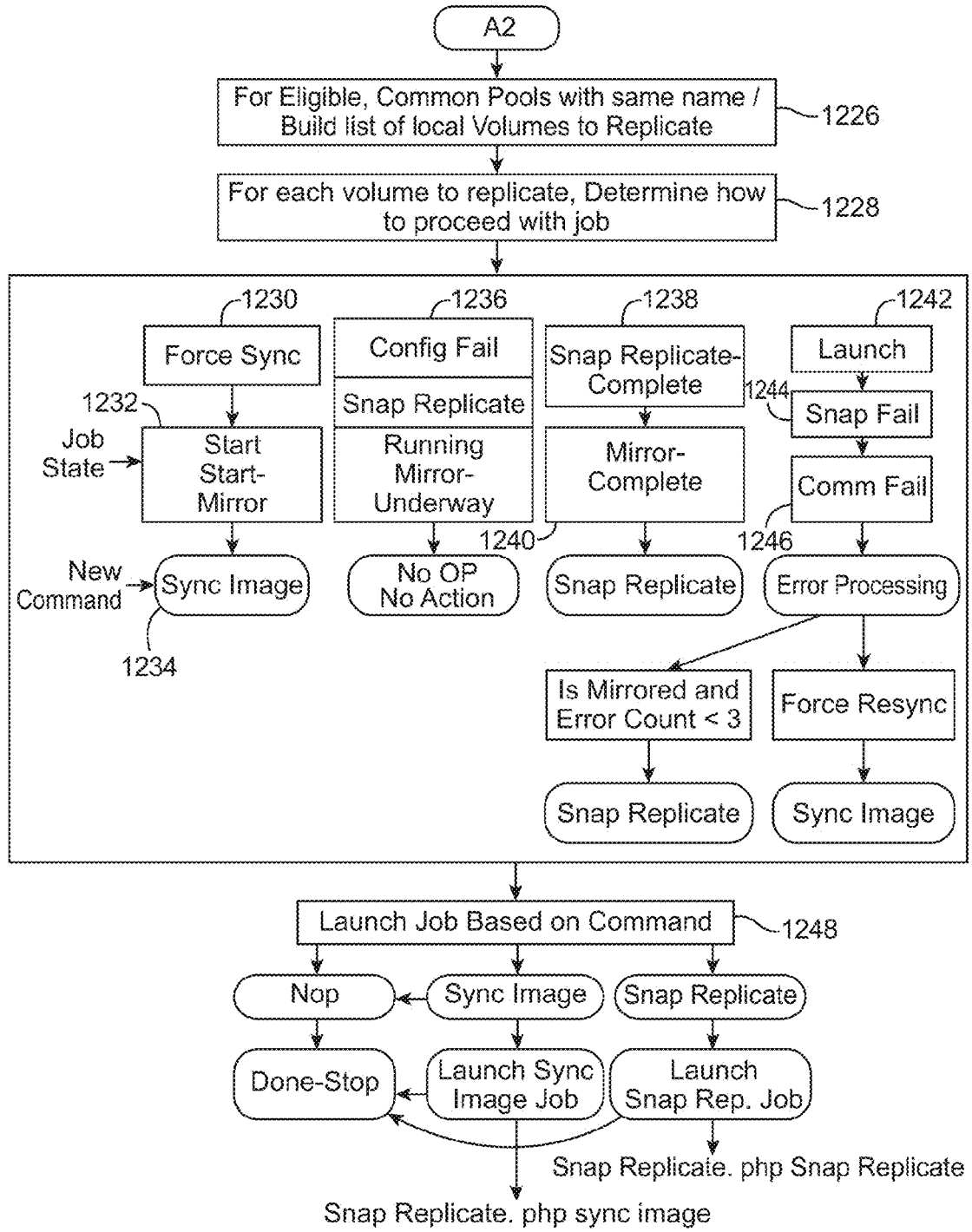

FIG. 12 and FIG. 13 illustrate a method 1200 of replication cycle processing within this disclosure. As indicated in FIG. 12, the cycle processing can occur once every minute 1201 and can incorporate error detection and recovery 1203 functions. The method 1200 begins by determining whether or not the relevant licenses are valid. If they are not valid, the method 1200 stops. If they are valid, the method 1200 continues to step 1204 in which relevant jobs are started. The method 1200 then proceeds to step 1206, in which local status files are read. Once step 1206 is completed, the method proceeds to step 1208 in which remote status files are read. The method 1200 can then proceed to step 1210, in which a remote takeover command can be detected. If a remote takeover command is detected, the source node can be established as a (virtual) target node 1212, and the method 1200 stops. If a remote takeover command is not received, the method 1200 can continue to step 1214, in which the source node continues to exist as a source node. The method then can continue to step 1216, in which it is determined if active replication is taking place. If it is not taking place, the source is considered to be inactive 1218 and the method stops. If active replication is verified, the method 1200 continues to step 1222 in which remote data pools are scanned. Once step 1222 is completed, a command pools list can be built at step 1224. Once step 1224 is completed, the method 1200 proceeds to step 1226, in which eligible common pools with the same name, a list of local volumes requiring replication is built. The method then proceeds to step 1228, in which, for each volume requiring replication (see step 1126), a determination is made as to how to proceed. The method can then proceed to step 1230 in which synchronization is forced 1230. After step 1230, a mirror image can be set up in step 1232. Thereafter, the image of one volume can be synchronized at step 1234. In the alternative, the method can proceed to step 1236, in which a determination is made that the configuration has failed. If this is because a mirroring action is already underway (see step 1232), no operation occurs. In the alternative, if a snap replicate action is complete 1238 and a mirroring action is complete, the method 1200 can perform a snap replicate action, as described herein. In the alternative, the method 1200 can attempt to launch a snap replicate action at step 1242. If this action fails 1244 or a communication fails 1246, error processing and recovery can be invoked. Error processing can involve running a forced resynchronization action 1247, as shown. Thereafter, the method 1200 can proceed to step 1248, in which various job based commands can be launched.

Figure 14:
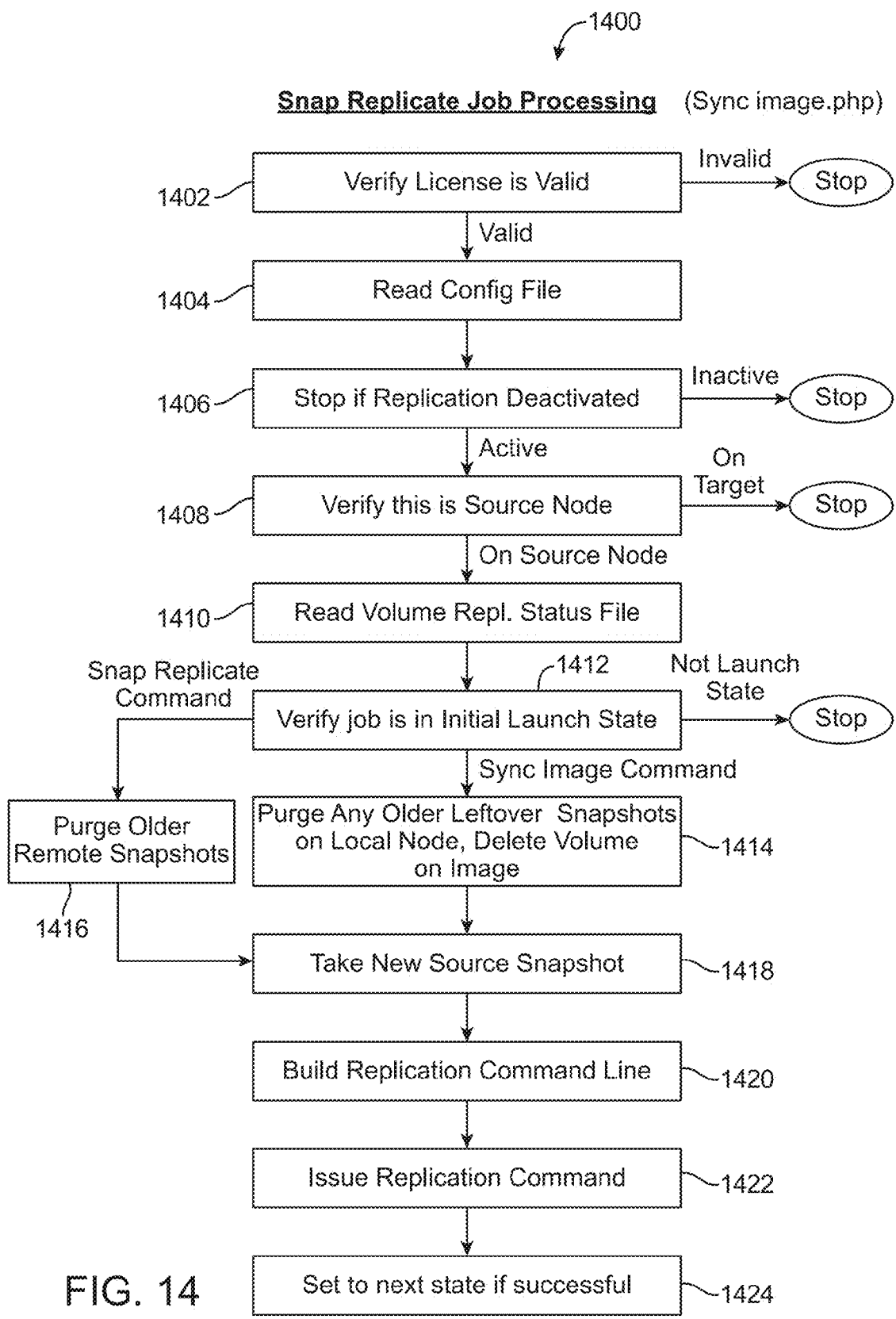
FIG. 14 illustrates an example method 1400 for running a data replication job within this disclosure.

FIG. 14 illustrates an example method 1400 for running a snap replication job within this disclosure. The method 1400 begins by verifying that the relevant licenses are valid at step 1402. If they are not valid, the method 1400 stops. If they are valid, a configuration file is read at step 1404. The method then proceeds to step 1406, where it is determined if the replication has been deactivated. If it has been deactivated, the method 1400 stops. If replication has not been deactivated, the method 1400 proceeds to step 1408, where it is determined if the node in question is a source node 302. If it is not, the method 1400 stops. If the node in question is a source node 302, the method 1400 proceeds to step 1410, in which a relevant volume replication status file is read. Thereafter, the method 1400 proceeds to step 1412, in which a determination is made as to whether the job is in an initial launch state. If it is not, the method 1400 stops. If the job is in an initial launch state, the method 1400 can execute a snap replicate command, causing the method 1400 to proceed to step 1416 in which older remote snap shots are purged. In the alternative, the method can proceed to step 1414, in which any older leftover snapshots on a local node are purged and volumes on the image are deleted. After either step 1416 or step 1414 is completed, the method 1400 proceeds to step 1418, in which a new snap shot is taken of the source node 302. The method 1400 then proceeds to step 1420, in which at least one replication command line is build. The method 1400 then proceeds to step 1422 in a replication command is issued. If step 1422 is successfully completed, the method 1400 proceeds to step 1424, in which the system is set to the next appropriate state.

Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, without departing from the scope of the disclosure.

What is claimed is:

1. A method of establishing a synchronization relationship between data storage nodes in a system, the method comprising:
    obtaining access to at least one source node, the source node configurable to store at least one source storage pool and at least one source volume;
    obtaining access to at least one target node, the target node configurable to store at least one target storage pool and at least one target volume;
    creating a first authentication information element associated with the source node and a second authentication information element associated with the target node;
    authorizing secure two-way communication between the source node and the target node based on exchanging at least one of the first or second authentication information element;
    establishing a secure replication relationship, via the secure two-way communication over a communication network, between the source node and the target node, wherein the at least one target node and the at least one source node are in different locations in a cloud; and
    automatically discovering one or more storage pools and volumes to be replicated by:
        automatically discovering the storage pools on the source node and the target node;
        automatically creating a command pools list based on the storage pools having the same name;

automatically discovering the volumes in each such storage pool;

automatically adding the discovered volumes of each storage pool to the command pools list; and automatically configuring tasks necessary for each volume to be replicated, wherein the tasks comprise launching an initial replication cycle for the command pools list.

2. The method of claim 1, wherein the authorizing is via at least one secure shell.

3. The method of claim 1, wherein the first authentication information element is a public key.

4. The method of claim 1, wherein the second authentication information element is a private key.

5. The method of claim 1, wherein the determination further comprises automatically determining whether the initial replication cycle is a full back-up or synchronization from the source node to the target node of all storage pools and volumes in the source node is necessary.

6. The method of claim 4, further comprising executing the full back-up or synchronization from the source node to the target node of all storage pools and volumes in the source node, upon the determination.

7. The method of claim 1, further comprising performing a data replication once per a first predetermined period, the data replication comprising synchronizing data on the source node to the target node which has changed within a second predetermined period.

8. The method of claim 7, wherein the first predetermined period is one minute.

9. The method claim 7, wherein the second predetermined period is two minutes.

10. The method of claim 1, further comprising automatically detecting errors during synchronization and automatically recovering from detected errors.

11. The method of claim 10, wherein the system is configured to be enabled to receive a take-over command with regard to the target node, thereby taking control away from the source node and establishing control in an alternate source or in a user-interface.

12. The method of claim 1, wherein the system is configured to receive a take-over command with regard to the target node, thereby taking control away from the source node and establishing control in an alternate source or in a user-interface.

13. A system for synchronizing information stored on at least two storage devices, the system comprising:
at least one non-transitory computer-readable medium storing instructions;
at least one processor coupled to the at least one non-transitory computer-readable medium, the processor configured to, upon execution of the instructions to:
obtain access to at least one source node, the source node configurable to store at least one source storage pool and at least one source volume;
obtain access to at least one target node, the target node configurable to store at least one target storage pool and at least one target volume;
create a first authentication information element associated with the source node and a second authentication information element associated with the target node;
authorize secure two-way communication between the source node and the target node based on an exchange of at least one of the first or second authentication information element;
establish a secure replication relationship, via the secure two-way communication over a communication network, between the source node and the target node, wherein the at least one target node and the at least one source node are in different locations in a cloud; and
automatically discover one or more storage pools and volumes need to be replicated by:
automatically discovering the storage pools on the source node and the target node;
automatically creating a command pools list based on the storage pools having the same name;
automatically discovering the volumes in each such storage pool;
automatically adding the discovered volumes of each storage pool to the command pools list; and
automatically configuring tasks necessary for each volume to be replicated, wherein the tasks comprise launching an initial replication cycle for the command pools list.

14. The system of claim 13, wherein the authorization is via at least one secure shell.

15. The system of claim 13, wherein the first authentication information element is a public key.

16. The system of claim 13, wherein the second authentication information element is a private key.

17. The system of claim 13, comprising further instructions, which upon executed cause the processor to:
automatically determine whether the initial replication cycle is a full back-up or synchronization from the source node to the target node of all storage pools and volumes in the source node is necessary.

18. The system of claim 17, comprising further instructions, which upon executed cause the processor to:
execute the full back-up or synchronization from the source node to the target node of all storage pools and volumes in the source node upon the determination.

19. The system of claim 18, wherein the first predetermined period is one minute.

20. The system of claim 18, wherein the second predetermined period is two minutes.

* * * * *